(12) United States Patent
Strothmann

(10) Patent No.: US 11,716,007 B2
(45) Date of Patent: Aug. 1, 2023

(54) SYSTEM OF ONE OR MULTIPLE CONTACTLESS EDDY CURRENT GENERATORS ON CONDUCTIVE COUNTER ELEMENTS IN A PERFORMANCE-OPTIMISED ARRANGEMENT RELATIVE TO ONE ANOTHER, AND USES THEREOF IN

(71) Applicant: Dirk Strothmann, Borgholzhausen (DE)

(72) Inventor: Dirk Strothmann, Borgholzhausen (DE)

(73) Assignee: Dirk Strothmann, Borgholzhausen (DE)

( * ) Notice: Subject to any disclaimer, the term of this patent is extended or adjusted under 35 U.S.C. 154(b) by 205 days.

(21) Appl. No.: 16/766,779

(22) PCT Filed: Nov. 25, 2018

(86) PCT No.: PCT/EP2018/000534
§ 371 (c)(1),
(2) Date: May 26, 2020

(87) PCT Pub. No.: WO2019/101360
PCT Pub. Date: May 31, 2019

(65) Prior Publication Data
US 2020/0369338 A1 Nov. 26, 2020

(30) Foreign Application Priority Data
Nov. 25, 2017 (DE) .......................... 202017006079.5

(51) Int. Cl.
*H02K 49/04* (2006.01)
*H04W 4/40* (2018.01)
(Continued)

(52) U.S. Cl.
CPC .............. *H02K 49/046* (2013.01); *B62J 6/01* (2020.02); *B62J 6/04* (2013.01); *B62J 6/22* (2020.02);
(Continued)

(58) Field of Classification Search
None
See application file for complete search history.

(56) References Cited

U.S. PATENT DOCUMENTS

| 4,970,630 A * | 11/1990 | Mudrovich | ................ B62J 6/03 |
| | | | 362/523 |
| 2010/0013241 A1* | 1/2010 | Yeh | ........................... B62J 6/10 |
| | | | 290/1 C |

(Continued)

FOREIGN PATENT DOCUMENTS

| CN | 204750394 U | * 11/2015 |
| EP | 2189359 B1 | * 7/2013 ........... B60Q 1/1423 |

(Continued)

*Primary Examiner* — Fekadeselassie Girma

(57) ABSTRACT

By means of the system described, the use of eddy current generators on vehicles, especially bicycles, can be simplified by easier integration into standardized components such as brake pads, making them more suitable for everyday use. The problem of overcoming the magnetic holding forces at low speeds is essential for cyclists, as these would otherwise rule out the use of such systems in everyday traffic due to the lack of power generation when starting off at low speed. The integration into brake pads provides a significant advantage, as a new functionality is achieved without the need for additional components. The claimed additional functions for signalling contribute to increased traffic safety, especially for two-wheel traffic.

13 Claims, 4 Drawing Sheets

(51) Int. Cl.
*B62J 6/01* (2020.01)
*B62J 50/22* (2020.01)
*B62J 6/22* (2020.01)
*G08G 1/16* (2006.01)
*G08G 1/00* (2006.01)
*B62J 45/412* (2020.01)
*B62J 6/04* (2020.01)

(52) U.S. Cl.
CPC ............. *B62J 45/412* (2020.02); *B62J 50/22* (2020.02); *G08G 1/166* (2013.01); *G08G 1/22* (2013.01); *H04W 4/40* (2018.02)

(56) References Cited

U.S. PATENT DOCUMENTS

| | | | |
|---|---|---|---|
| 2010/0283590 A1* | 11/2010 | Tee | A42B 3/044 |
| | | | 340/432 |
| 2012/0051072 A1* | 3/2012 | Yelverton | B62K 19/30 |
| | | | 362/473 |
| 2015/0027269 A1* | 1/2015 | Li | B62K 21/12 |
| | | | 74/551.9 |
| 2015/0197299 A1* | 7/2015 | Lee | B62J 6/04 |
| | | | 280/288.4 |
| 2017/0151991 A1* | 6/2017 | Hur | H02J 7/1438 |

FOREIGN PATENT DOCUMENTS

| | | | | |
|---|---|---|---|---|
| EP | 2703264 A1 | * | 3/2014 | ............... B62J 6/08 |
| JP | 2001037108 A | * | 2/2001 | |
| JP | 3769512 B2 | * | 4/2006 | |
| JP | 5984025 B2 | * | 9/2016 | ............... H02K 7/11 |
| KR | 20170088586 A | * | 8/2017 | |

* cited by examiner

SYSTEM OF ONE OR MULTIPLE CONTACTLESS EDDY CURRENT GENERATORS ON CONDUCTIVE COUNTER ELEMENTS IN A PERFORMANCE-OPTIMISED ARRANGEMENT RELATIVE TO ONE ANOTHER, AND USES THEREOF IN

STATE OF THE ART

The invention is based on the German utility model DE202011107060U1, which describes a device for contactless current generation on a rotatable conductive counter element, in particular a wheel rim, with at least one movably mounted rotor element comprising at least one magnet, which rotates by eddy current interaction with the counter element and induces a current into at least one coil during rotation.

Non-contact eddy current generators are used primarily as bicycle dynamos on metal rims (2) with a rotatable dipole (1)—or alternating multipole wheel (3) (i.e. several adjacent circular segment magnets (3a, 3b) in alternating pole sequence) made of neodymium with a high magnetic field strength. Dynamos with uniformly arranged six-pole wheels (i.e. magnetic wheels consisting of 6 magnetic segments of the same size with alternating pole sequence) are particularly interesting from an economic point of view, since, just like dipole wheels, they have opposite poles directly opposite each other on the outer circumference. This makes a mechanically very simple, space-saving and efficient generator design possible by winding a coil (4) around the central area of the magnet wheel to generate electricity. Instead of a magnet wheel, non-circular magnet forms are also possible and included in the invention accordingly (e.g. square or hexagonal basic forms), whereby the circular form is usually advantageous in practice.

The advantage of dipole wheels is the low cost for production, since dipoles can be manufactured easily and inexpensively from one piece, while the individual segments of six-pole or multi-pole magnetic wheels with high magnetic field strength usually have to be assembled by hand, which is comparatively error-prone and expensive.

In addition, dipoles or magnetic wheels with only a few alternating poles on the outside have a greater magnetic field range (7) than multi-pole magnetic wheels of the same size (8), since the individual dipole segments are wider and thus have a stronger magnetic field than the narrower segments of multi-pole magnetic wheels of the same circumference with more than 2 poles in alternating pole sequence.

In practice, for example when used as a bicycle dynamo, there is the advantage that a dynamo with a dipole magnet ring also works at a greater distance from the rim (2), since the larger magnetic field range ensures sufficient eddy current gearing with the rotating rim. On the other hand, compared to six-pole or multi-pole magnetic wheels, the use of rims made of ferromagnetic steel or rims with partial elements made of ferromagnetic material has the disadvantage that, due to the strong permanent magnetic attraction, the dipole magnetic wheels do not rotate along the rim until the rim speed is high enough, since for the required rotation of the magnetic wheel, the driving force to be achieved by eddy current gearing with the rim must first overcome the holding force of the magnetic wheel on the ferromagnetic rim.

This problem hardly ever occurs with multi-pole magnetic wheels, especially those with at least six poles, since the small angle between the alternating poles (60 degrees compared to 180 degrees for the dipole) means that the holding force to be overcome is very small.

In practice, combined systems in which 2 generators are mounted on both sides of the rim are particularly interesting, especially if the generators are equipped with lighting (13, 14) in an encapsulated wireless unit (12). On the one hand, this is advantageous for increasing the eddy current gearing by mutually reinforcing the opposing magnetic fields, and on the other hand, it is also advantageous compared to the use of a single lamp next to the rim, where shading of the tyre reduces visibility from the other side and also reduces illumination of the road on the opposite side of the wheel.

PROBLEM

Mounting dipole magnetic wheels on both sides has the disadvantage that, due to the strong permanent magnetic holding forces between the magnetic wheels mounted on both sides of the rim, a high driving speed must be achieved in order to overcome the holding forces and get the magnetic wheels rotating. Although this holding force and thus also the minimum speed required for power generation decreases with increasing distance between the two magnetic wheels, the eddy current gearing and thus the system performance also decreases when the magnetic wheels are mounted symmetrically on both sides of the rim. For this reason, only double-sided systems in which 6-pole wheels are mounted on both sides of the rim have been able to establish themselves in practice.

The utility model DE202011107060U1 describes the mounting of magnetic wheels inside or in connection with brake shoes (10) and brake pads (11) of rim brakes, which is important for bicycles. In practice, this has the great advantage that the user does not need to attach any additional mountings. The installation of the bicycle lighting is therefore extremely simple and is already completed with the attachment of the brake block. The integration of a complete generator and lighting unit in or on a brake shoe has the further advantage that this is located very close to the rotating metal rim and thus in the ideal working position of the contactless eddy current generator. For a market acceptance of such a system, it is necessary to exceed the usual market dimensions at most barely noticeably, which results in a minimum of space for the generator (a generator height of 10 mm and a diameter of 15 mm should hardly be exceeded to obtain a marketable product). Due to the minimal system size, such a lamp is mainly visible on one side of the rim, so that satisfactory visibility is achieved by mounting on both sides.

So far, two main problems have prevented the use of small generators in brake pads:

1. Due to the small size of a brake shoe, the magnetic fields of 6-pole wheels are hardly sufficient for an adequate power generation, and if dipole magnetic wheels with far-reaching magnetic fields were used, the initial speed of the cyclist required for generator operation would be too high to be accepted by the market: Approx. 15 km/h would be necessary to overcome the holding force of two dipole neodymium magnet wheels with 11 mm diameter and N52 magnetisation, which are mounted on opposite sides of the rim at 3 mm rim distance.

2. An essential feature of non-contact eddy current generators is the high decrease of power with increasing rim distance (generally: increasing distance to the conductive rim element). When using very small generators in brake shoes, it is therefore very important to keep the distance between the rims as small as possible in order to achieve good generator performance for good lighting values. However, if the generator is accommodated in the brake shoe, there is a risk that it will be damaged when braking and approaching or touching the rim. If you try to avoid contact with the rim by increasing the distance between the rims, there is the additional problem that the brake rubber of a rim brake becomes thinner in the course of wear and tear, so that an additional safety distance must be added according to the thickness of the brake rubber which is subject to wear. In practice, it is expected that a brake rubber may lose at least 4 mm in thickness during the course of use with full functionality, so that the generator would be an additional 4 mm away from the rim, which is no longer sufficient for good eddy current gearing with a small generator.

It is the task of this invention to overcome the problems of non-contact eddy current generators described in the 2 points above and thus to provide solutions for practical use in brake shoes of rim brakes in particular.

Regardless of the minimum size of the system described in the examples and the use in brake shoes of bicycle rim brakes, the invention also includes larger systems with comparable problems: The relations given for small generators with respect to magnetic wheel size and rim distance can be extended to larger systems accordingly.

SOLUTION

Solutions to Problem 1

Combination Dipole Wheel/Multipole Wheel

The problem (described under point 1) of insufficient magnetic field range (8) (with regard to the eddy-current toothed counter-element/wheel rim (2)) of small 6-pole magnetic wheels (3) and dipole wheels (1) mounted on both sides is solved by a combination in which a dipole wheel is mounted on one side (rim) and an alternating multipole wheel (ideally a 6-pole magnetic wheel) on the opposite side of the rim. By magnetic coupling of the dipole wheel with the multipole wheel, the advantageous property of the greater effective distance of the dipole wheel (8) can be combined with the lower holding torque (associated with earlier starting at low speed) of the multipole wheel. This combination of the two magnet wheels thus permits a greater rim distance than a combination of two multi-pole wheels, and the rotation of the magnet wheels with resulting current generation already starts at significantly lower speed compared to the corresponding combination of two dipole wheels. The two magnet wheels must be combined in such a way that the power consumption on both sides is as identical as possible. This can be optimized by adjusting the magnet wheel volume (diameter and height), coil winding (4) (number of windings and wire cross-section) and magnetic field strength (7, 8) to the ratio of the number of magnetic fields of the dipole to the multipole.

An extension to combinations with further dipole and multipole generators is possible, whereby for the overall view all paired relationships with regard to magnetic wheels with overlapping magnetic fields must be considered.

Combination of Two Dipole Wheels by Means of a Shifting Mechanism

Another possible solution is to use two dipole wheels (1, 1b) or generators with correspondingly strong magnetic fields on both sides of the rim (2), whereby at slow rotation of the rim (5), initially only one magnetic wheel is located close to the rim for the generation of current and the opposite second magnetic wheel is only moved closer to the opposite side of the rim by a mechanism (e.g. controlled by a stepping motor) when the speed is sufficiently high and the first magnetic wheel is rotating (6). Due to the rotation of the first magnet wheel already present, the second magnet wheel then also rotates, since the holding force present at standstill no longer needs to be overcome. Since a mechanism for moving a magnet wheel is very complex, both mechanically and electronically, this method is difficult to implement for systems that shall be kept very small or inexpensive.

Combination of Two Dipole Wheels by Means of Rotational Impulse

Another solution to the problem of combining two dipole wheels (1) or generators with correspondingly strong magnetic fields on both sides, is the usage of an initial rotation impulse (6) which overcomes the holding forces between them and thus start rotation of one or both magnetic wheels in the direction of the rim when rim movement (5) begins. Even if the rim continues to rotate at low speed, the rotation started once is then sufficient to keep the magnetic wheels of the contactless generators rotating and thus to keep the generators in operation. One possibility of realizing such a rotation impulse without a mechanically complex additional mechanism is the reverse usage of the generator coil(s) (4) at standstill or low speed and drive the generator magnet wheel. For example, a current pulse can be sent into the generator coil via a charged current storage device such as a capacitor, which might otherwise be used for a parking light function, which causes the necessary initial rotation (6) of the magnet wheel to overcome the holding forces. The generator coil can be used as a signal transmitter, into which at least small voltage oscillations are induced during relative movement of the counter element due to irregularities in the rim and the associated slight vibrations of the magnet wheels. This starting impulse can be detected in the generator coil circuit by a controller unit, so that no additional sensors have to be used to detect the starting process.

Combination of a Lighting Unit with a Reflector

If (for example for cost reasons) only one of 2 brake shoes of a pair of rim brakes is to be equipped with a lighting unit and correspondingly a generator, it makes sense to make the other side more visible to road traffic. Here it is a cost-effective and efficient variant to use a generator with a dipole wheel (1) and correspondingly high magnetic field strength (corresponding to the generator range) on one side and to equip the second brake shoe only with a reflector. In this way, the cost for the second lighting unit is saved and at least passive lighting on the side of the reflector is guaranteed.

Combination of Differently Sized Magnetic Wheels

Another cost-effective solution is to use a second dipole wheel, which is very small compared to the main dipole wheel, for the second generator on the opposite side of the rim. This must be selected so small or of such low field strength that the magnetic force is not sufficient to significantly decelerate the larger dipole magnetic wheel on the opposite side of the rim. At the same time the small dipole wheel should be selected large enough to supply enough current for weak visual lighting even at large distance from the rim (i.e. lighting sufficient to be noticed by other road users) when the small dipole is driven by the magnetic field of the larger magnetic wheel on the opposite side of the rim. For commercially available aluminium rims (width of approx. 20 mm), a combination of a dipole magnet wheel with a diameter of 11 mm and a height of 8 mm with a dipole magnet wheel of the same height and a diameter of 3 mm gives correspondingly good results.

Equal Sided Arrangements of Magnetic Wheels

While the previously presented solutions describe the arrangement of magnetic wheels on opposite sides of a centered eddy-current-geared conductive counter element (2), these solutions can also be extended to the arrangement of corresponding magnetic wheels on the same side of the counter element/rim and their combination with further two-side arrangements of magnetic wheels. The same principles apply with regard to size ratios and relations between dipole and multipole for double-sided or single-sided mounting, whereby the mutual effect of the magnetic wheels on each other is essentially influenced by their distance from each other.

Solutions to Problems 2

When integrating the generators in brake shoes of rim brakes, it should be noted that the brake pads (11) wear out during use and lose volume until they are replaced. In order to prevent the generator unit (12) from being damaged by contact with the rim, either the distance between the generator and the rim (2) should be selected so large that there is still no contact with the rim even when the brake pad (11) is worn down to a minimum thickness (usually associated with severely impaired generator performance due to weak eddy current gearing), or the generator unit is moved further away from the rim by a mechanism as the brake pad loses volume.

Shifting Mechanism with Optional Spring Element with Return to Initial State after Completion of Braking or after Rim Contact In particular, a spring mechanism is suitable which increases the distance between the generator unit and the rim when the rim brake is actuated (associated with movement of the brake shoe in the direction of the rim) to prevent rim contact and returns to the initial state after the braking process is completed. Such a mechanism consists, for example, of a parallelogram spring (15) connecting the brake shoe housing (10) with the generator housing (12) so that a contact of generator housing and rim (2), causes bouncing away from the rim over the spring travel (15d) relative to the brake shoe (10). If there is no longer any contact with the rim, the parallelogram spring returns to its initial state, so that the generator always lies very close to the rim and can thus deliver a large output. In order to prevent wear of the housing due to grinding, it is advantageous to apply a protective coating, ideally replaceable, or a spacer element (15a) on or next to the housing.

Shifting Mechanisms without Return to the Initial State after Completion of the Braking Process or after Rim Contact When integrating the generator into a brake shoe (10), a particularly compact and shock-resistant mounting is important to ensure a long service life. A shock-resistant connection of the brake shoe (10) and the generator unit (12), which can be moved linearly under pressure, is particularly advantageous, as it allows the generator unit to be moved further away from the rim (2).

A design according to the invention of this mechanism provides that the brake shoe housing (10) has a groove (17) (or elongated recess) open towards the generator unit (12) and the rim (2) and the generator unit has a slide counterpart (12b) fitting into the groove, which can slide towards and away from the rim under the action of pressure in the groove (17).

In the initial state, the generator unit is spaced somewhat further from the rim than the brake rubber (11), so that no contact of the generator unit with the rim occurs during braking (associated with rim contact by the brake rubber). An additional slide spacer element (16) fitting into the groove is inserted into the groove (17) is constructed in such a way that it directly touches the generator slide element on one side and has the same distance from the rim as the brake rubber (11) on the rim side. Due to wear and the associated reduction in volume of the brake rubber during repeated braking, the slide spacer element (16) also comes into contact with the rim and is pushed away from the rim by the applied pressure, whereby it slides within the groove. Thus the adjacent slide counterpart (12b) of the generator unit (12) is also pushed further away from the rim (2) within the groove (17). As a result of this, the entire generator unit (12) is pushed away from the rim (2) by the same amount corresponding to the reduction in the thickness of the brake rubber, so that the distance between the generator unit and the rim does not change and there is no contact with the rim.

Non Encapsulated Magnetic Wheel Rotating Along the Rim at Sporadic Rim Contact (for Example During Braking)

In order to prevent or minimize damage or wear to the generator unit (12) on contact with the rim (2), a generator design is also suitable in which the generator housing or the magnet wheel (1, 3) (which is advantageously covered with a protective jacket) can rotate directly with the rim on occasional contact with the rim, thus minimizing abrasion by sliding contact. This construction is also possible as an addition to the two mechanisms mentioned above, which change the position of the generator in relation to the brake shoe.

Supplements to Extend the Application Possibilities
Adjustable Light Beam

In order to be able to align the light cone of the connected headlamp unit well to illuminate the road and to avoid dazzling other road users, the headlamp unit is preferably mounted vertically rotatable relative to the generator housing (14b). This is important because rim brakes are mounted at different angles and there is no standard for all bicycles with rim brakes.

Realization of a Parking Light Function Using Phosphorescence

When used as bicycle lighting in rim brakes, the problem arises that a parking light function commonly used today is difficult to integrate due to the minimal housing size with little space for a storage capacitor and parking light electronics. In order to realize a parking light function at a reasonable price without this expensive additional electronics, the headlamp unit is designed according to the invention by using a phosphorescent element in addition to the headlamp illumination or in a surrounding, preferably semi-transparent headlamp housing, which is at least partially made of phosphorescent material. The parking light function is realized in this case by illuminating the phosphorescent material while driving, and when the lighting unit is stationary, it illuminates for a certain period of time when the lighting unit goes out. It must be taken into account that a large blue component of the emitted light spectrum of the light source is decisive for a strong charging of the phosphorescent material. Since the parking light function is particularly useful for a tail light, which should normally shine red, it is advantageous to use a reddish housing that is transparent to light, which appears reddish when irradiated with white-blue light, so that the use of two LEDs with a combination of red and blue light (for phosphorescent charging) is not necessary.

Implementation of Side Lighting of the Rim Using Phosphorescence

An important safety criterion for cyclists is good side visibility in the dark. By applying phosphorescent material, e.g. by mixing it into the tyre material, applying it to the tyre or to the rim (2) and, in particular, by subsequently sticking phosphorescent adhesive strips (30) onto the rim, the wheels can be used for large-area lateral lighting by illuminating the applied phosphorescent material with a suitable blue to ultraviolet wavelength while riding. Due to the phosphorescent property, the irradiated areas illuminate while driving, so that even if the material is only partially applied, an illumination over the full wheel circumference is visible when viewed from the side at a sufficiently high rotational speed.

An embodiment according to the invention uses a special bluish (to ultraviolet) LED with a light spectrum suitable for phosphorescence to irradiate the applied phosphorescent material. This LED can be used alone or in addition to a driving light LED. The use of two anti-parallel switched LEDs for driving light and phosphorescence charging in combination with a housing (14) or a headlight part (13) made of phosphorescent material is particularly advantageous. Such a circuit without the complex and power-reducing rectification required for the realization of a parking light in the headlamp unit of non-contact eddy current generators allows a simple parking light function by means of phosphorescence by irradiating the phosphorescent headlamp part with the bluish LED as described above. At the same time a part of the bluish light can be used to charge the phosphorescent material on the wheel/rim for side lighting. The second LED is used as driving light LED, so that for the realization of a parking light function, a side light and a driving light only two LEDs have to be connected antiparallel to the contactless eddy current generators which produce an alternating voltage.

Radio Speed Sensor

If an internal microcontroller is used, changes in speed can be determined from the voltage changes of the generated AC voltage or the resulting voltage zero-crossings registered in a time period. Since a wheel rim (2) is not completely regular (slight imbalance, valve hole, steel valve in the rim), a characteristic speed profile of the magnetic wheel (1, 3) of a non-contact eddy current generator is produced with every revolution of the rim. If the circumference of the rim(wheel) is known, the speed of the wheel can be precisely determined and further processed from this profile and sent to a display device via a radio link. In the field of wireless tachometers, the radio network standards ANT+ and Bluetooth Low Energy have become established in recent years. These allow the measured values to be sent or received between each other or to external devices by means of very low-current transmitter/receiver units.

Due to the low power consumption and the minimal size of the ANT+ and Bluetooth LE (or comparable standards) transmitter/receiver units, the accommodation and operation within the electronics of a contactless eddy current generator, which is mainly used for power generation for bicycle lighting, is possible without any problems. While speedometers have so far mostly received their signals from sensors via radio or cable, which have to be attached to the wheel specifically for speed measurement (often with additional spoke magnets to be installed), these speed sensors can be completely replaced by using a radio chip within the electronics of the non-contact generator. The determination and transmission of the speed data can thus be carried out as a secondary task without the need for an additional speed sensor or revolution counter.

Radio Cadence Sensor

The cadence of a cyclist can also be determined from the speed profile of the magnet wheel of a non-contact eddy current generator, since when pedalling with alternating load on the left and right crank and slight weight shift due to twisting of the frame and wheels, a lateral movement of the wheel relative to the frame or fork occurs.

This lateral movement means a change in the distance between the rim (2) and the brake block (10,11) resulting in the change in distance to an integrated contactless generator (12). Accordingly, the measurable speed of the magnet wheel increases with decreasing distance from the rim and decreases with increasing distance. The signal, which recurs at regular intervals during cycling, alternates in both directions with each pedal stroke and can be further processed for speed measurement. By combining the results obtained on both sides of the rim, the accuracy of the system can be increased. This allows the determination and dispatch of the cadence data as a secondary task without the need for an additional cadence sensor.

Using suitable protocols, the determined data can be displayed on standard display devices but also on commercially available smartphones that support the corresponding radio network standards.

Accident Detection—and Notification

Another application is accident detection and sending a notification to external devices. A probable accident situation can be detected when the front or rear wheel suddenly slows down to a standstill, if an identical speed of the front and rear wheel has been previously recorded. If driving is not continued within a defined time interval, the event is evaluated as an accident and a signal is transmitted. This can be sent either to a carried smartphone or comparable device or to a passing vehicle in accordance with the standard accident reporting protocol.

Vehicle 2 Vehicle Communication and Vehicle 2 X Communication

According to the invention it is provided that radio signals according to radio standards for Vehicle 2 Vehicle communication as well as for Vehicle 2 X communication are sent and received by an integrated radio unit operated by the contactless generator, for example to exchange and display traffic-relevant data for collision avoidance with other traffic participants or devices. In this context, other internally available data such as the speed or a braking process readable from the generator can also be used and, if necessary, combined with position, traffic and environmental data in data exchange with a smartphone.

Blinker Function to Indicate a Turn

Another application is the usage for cyclists as flashing signal to indicate an upcoming turn. Using manually operated switches or a suitable device (e.g. a smartphone), the cyclist can trigger a signal to turn left or right, which is received and processed by the receiver units in the generator-light electronics. The front and rear lights on the left-hand side change to a characteristic flashing mode for a defined period of time after the signal to turn left is detected (optionally via an additional, ideally orange or yellow LED), while the right-hand lights continue to shine unchanged. The lamps involved react correspondingly to the signal to turn right in the opposite direction. The flashing signal stops after a stop signal is received by GPS alignment after the turn has been made or after a certain period of time has elapsed.

Turning Indication by Means of Brake Levers Instead of Additional Switches

A particularly interesting variant is the realization of the turn signal without the use of additional components to be attached to the wheel (no switch or a smartphone has to be used). For this purpose, a wheel must be fully equipped with a rim brake system, as is the case on most of the bicycles in use today. As a turn signal, the left front light (23) and left rear light (27) for turning left and the right front light (22) and right rear light (26) for turning right are switched to a flashing mode (or additional LEDs of a different colour used for the flashing indicator), while the lights on the opposite side are constantly lit.

The turning signal (20a, 24a) is transmitted by means of a short single or multiple actuation of the left (20) or right brake lever (24), which is not necessarily connected to rim contact (2) of the brake pads (11) (the desired signal can also be set for this purpose to suit the user).

As a rule, the front brake (21) is actuated with the left brake lever (20) and the rear brake (25) with the right brake lever (24). When the brake is actuated, the distance between the rim and brake shoe (10) is reduced and thus also the distance between the rims of the contactless generators mounted on both sides. The reduced distance between the rims increases the speed of the magnet wheel due to the stronger eddy current gearing and when the brake is released the speed of the magnet wheel decreases accordingly. The following processes are carried out on the front or rear brake shoes when the fixed turning signal is detected (e.g. one or two short brake applications):

A signal (20a) on the front wheel is detected in the two front brake shoes (22, 23) (but not on the rear wheel) and should therefore trigger a turning signal on the left side. To do this, the front left brake shoe light (23) switches to flashing mode (29a) for a fixed period of time and sends a signal (28) to turn left by radio transmission. This signal is received in the two rear brake shoe lights (26, 27), whereby only the left-hand light (27) is set to the flashing mode (29b) in accordance with the signal.

Conversely, a signal on the rear wheel is detected in the two rear brake shoes (26,27) (and not on the front wheel) and is intended to trigger a turn signal to the right. To do this, the rear right-hand lighting (26) switches to flashing mode and sends out a signal to turn right by radio transmission (28), which in turn is detected in the front right-hand brake shoe lighting (22) and is converted into a signal to switch to flashing mode.

A comparable turning-flashing function for bicycles, which does not require additional signal triggers to be attached to the wheel, is not yet known.

Navigation Display

A further application is the use of the lighting system as a navigation aid in combination with a navigation-capable smartphone or navigation device with radio signal. For this purpose, it must be ensured that the front lamps in particular light up clearly visible to the cyclist. In this way, the navigation system on board can send a signal to turn left or right if the cyclist has to carry out a turning manoeuvre according to the route calculation. This signal is detected by the lamps via radio sensor, so that ideally the left or right lamps (front and rear lights) will blink when the signal to turn left or turn right is given until the turn curtain is completed (a second signal can be specified to complete the turn). If there is no holder for the navigation system/smartphone on the wheel, it can be carried in a bag, so that the driver can be informed of the turning instructions without using a display. Moreover, the display via the lamps is much easier for the cyclist to see than a display on a small screen, which is often difficult to read due to sun reflection, and allows the cyclist to concentrate better on the traffic. Additional signals for navigation can be defined, and it makes sense to use a simultaneous illumination of the left and right front lights as a signal to turn round.

Making Settings by Radio Via a Smartphone

According to the invention it is provided that settings for signal processing and display in the lighting units can be made by radio signals using a smartphone. Thus, for example, the duration and intensity of a parking light, but also the selection of a flashing light mode or a turning signal can be conveniently set via smartphone.

Figure 1:
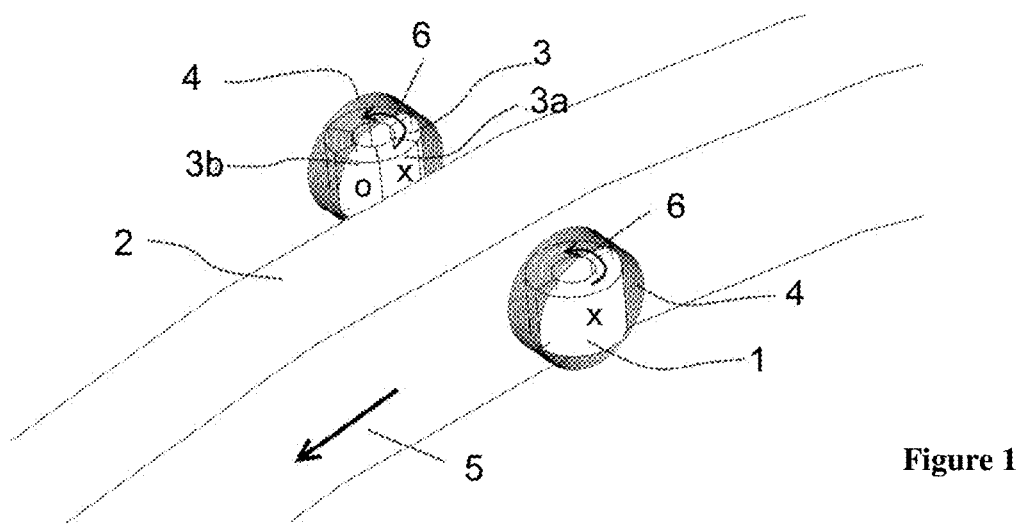
FIG. 1

A side view of a dipole wheel (1) in magnetic eddy-current gearing with a counter element (2) in the form of a rim and, on the opposite side of the rim, a 6-pole wheel (3), with a magnetic segment oriented in the direction of the rim with an external south pole (3a) next to a magnetic segment with an external north pole (3b), each wrapped with a coil (4). The south pole of the 6-pole wheel lies in the magnetic field of the dipole wheel (2) and is attracted by its north pole. Even with a slow rotational movement of the rim in the forward direction (5), the magnetic wheels (1) and (3) are rotating together with the rim (2) in the direction (6) by eddy current gearing.

FIG. 2

A front view corresponding to the side view in FIG. 1: The schematically shown magnetic field (7) of the dipole wheel (1) reaches the 6-pole wheel (3), while the smaller magnetic field (8) of the 6-pole wheel (3) is large enough for eddy current gearing with the counter element (2), but does not substantially interact with the dipole wheel (1). Thus, both magnetic wheels already rotate when the counter element rotates slowly.

FIG. 3

A front view of a dipole wheel (1) in magnetic eddy-current gearing with a counter element (in form of a rim) and, on the opposite side of the rim, a dipole wheel (1b) which is significantly further away from the counter element and is initially so far away from the dipole wheel (1) that o significant permanent magnetic holding force is exerted which prevents rotation (6) during slow rotation (5) of the counter element (2). Only when the counter element (2) rotates (5) the dipole wheel (1b) moves closer to the counter element (2) by means of a displacement mechanism (9) and then rotates along with the dipole wheel (1) to generate electricity.

FIG. 4

Figure 2:
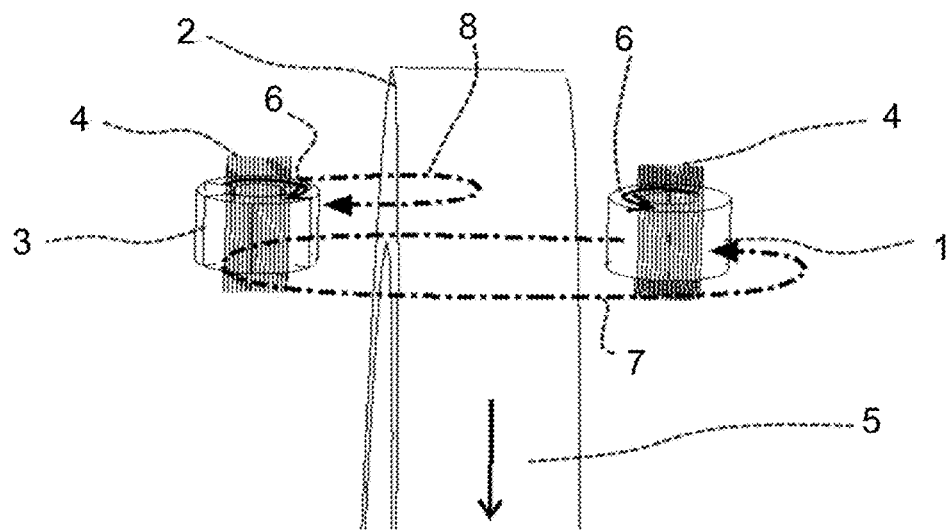
Figure 3:
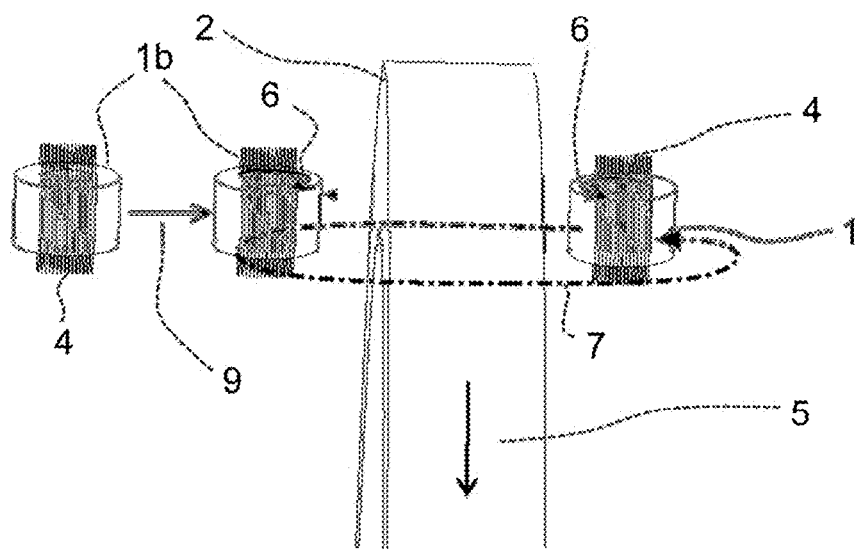
Figure 4:
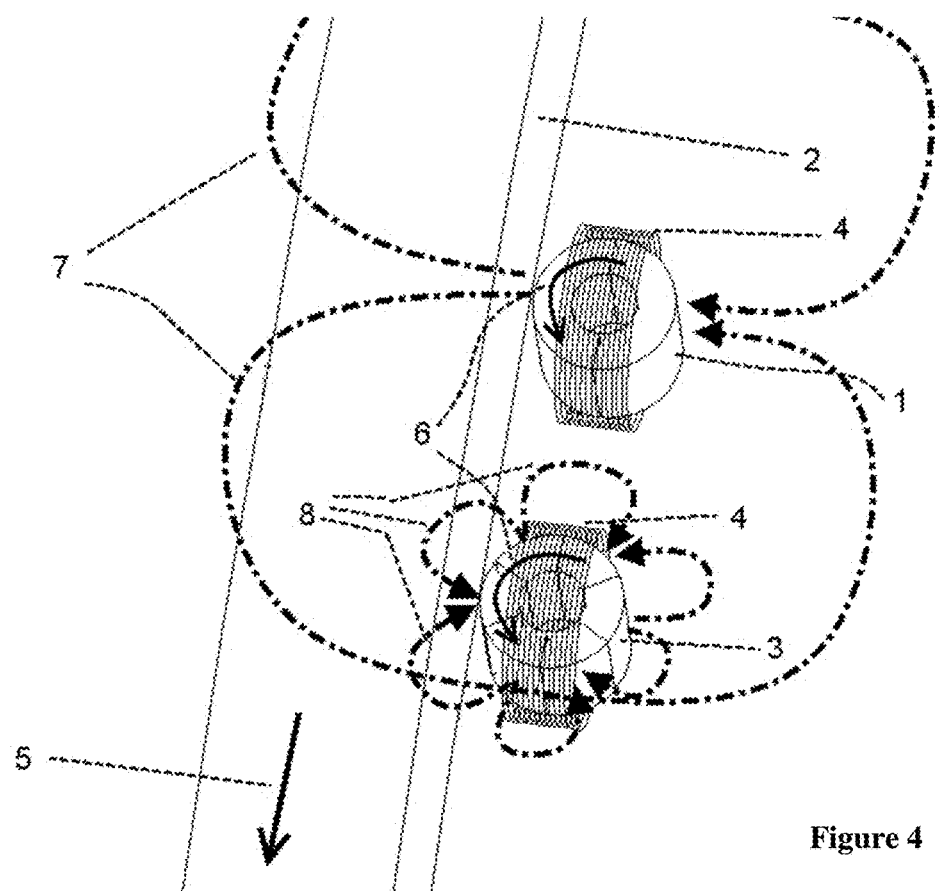
Figure 5:
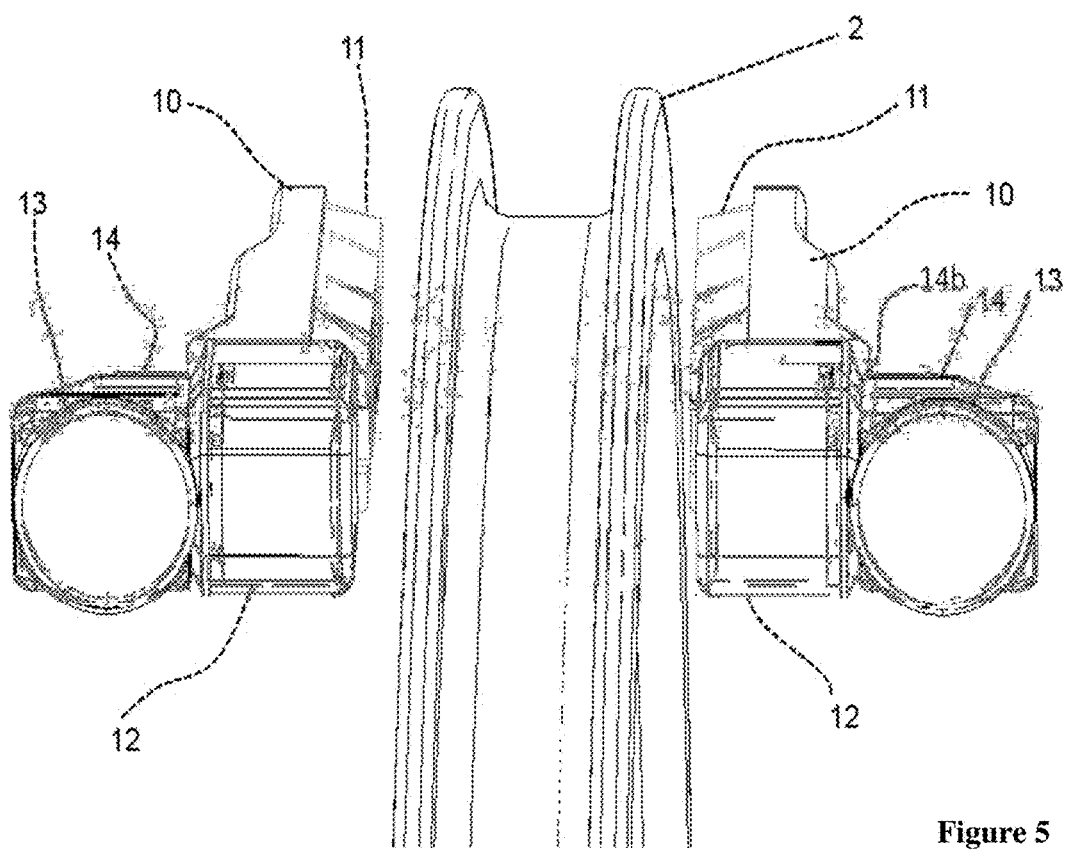

A front view of a dipole wheel (1) in magnetic eddy current gearing with a counter element (2) formed as a rim and a 6-pole wheel (3) on the same side of the rim. Equivalent to the arrangement on opposite sides shown in FIGS. 1 and 2, the smaller magnetic field range (8) of the 6-pole wheel (3) means that both magnetic wheels can rotate in the direction of the rim even at low rim speed (5) and can be used to produce electricity even at a low rim speed (5) when the magnetic field range (7) of the dipole wheel (1) is large. Due to the small magnetic field range of the 6-pole wheel, the permanent magnetic holding forces between the two magnetic wheels are too small to significantly impair the rotation (6) when the counter element (2) begins to move.

FIG. 5

A front view of two non-contact eddy current generators on opposite sides of a bicycle rim (2). The brake blocks (11) are ideally mounted in the brake shoe housing (10) so that they can be replaced. To prevent wear of the generator housing (12) due to rim contact, the distance between the rims should ideally be greater than the distance between the brake pads. The headlamp housing (14) with the focusing lens unit (13) can be rotated in relation to the road via a rotating mechanism (14b).

FIG. 6

An inside view of the notch or groove (17) for the sliding mechanism in the brake shoe housing (10) or brake rubber (11). If the arrangement is different, a standard brake rubber from another manufacturer can also be used, provided that the sliding mechanism is not integrated into the brake rubber (as shown here in a particularly space-saving variant).

The slide element (12b) on the generator housing (12) can move laterally in the groove (17), so that the generator housing (12) is displaced away from the rim according to the decrease of the thickness of the brake rubber. The displacement (18) in the groove (17) is achieved via the exchangeable spacer (16), which can also move laterally in the groove, by exerting pressure on the generator slide (12b) and thus on the entire generator part (12) when the spacer touches the rim laterally during braking and thus movies the generator housing away from the rim.

FIG. 7

Figure 6:
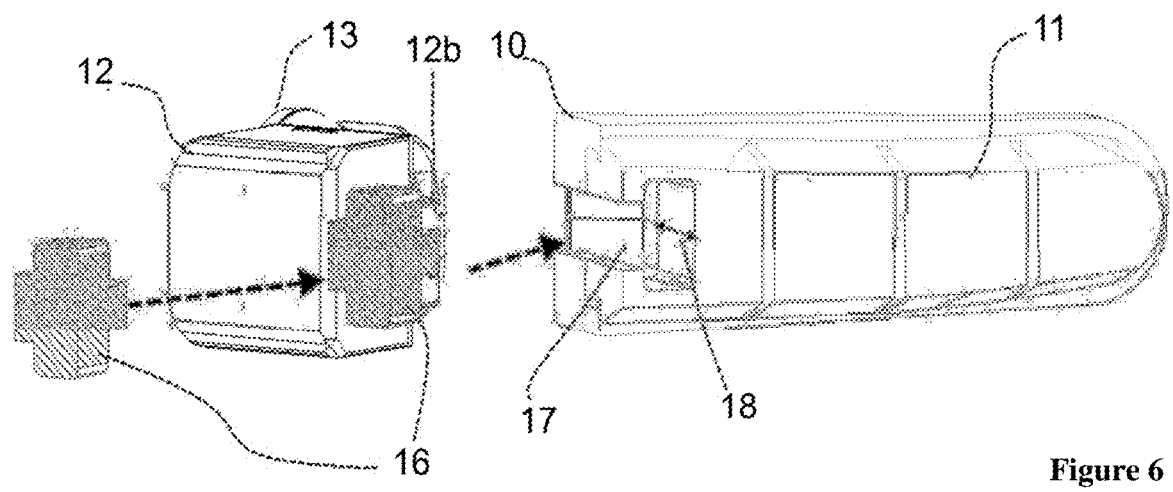
Figure 7:
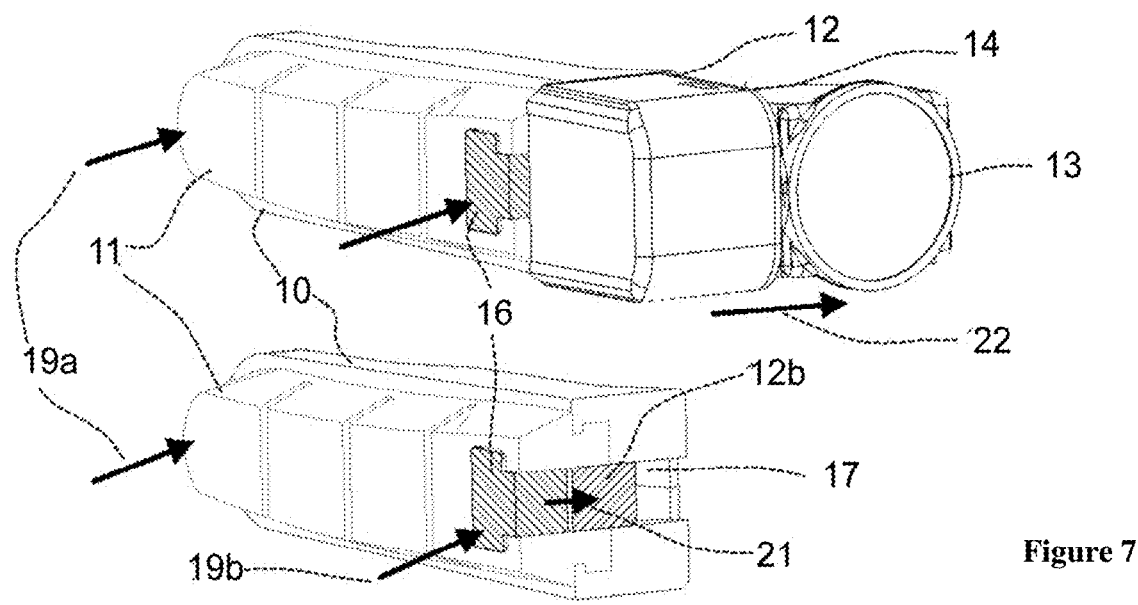
Figure 8:
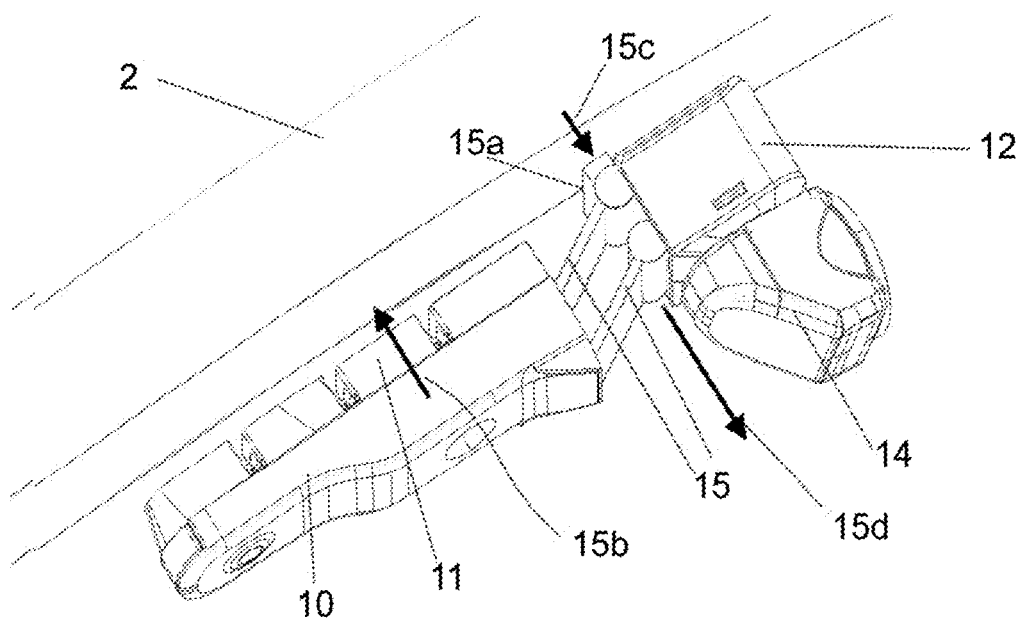
Figure 9:
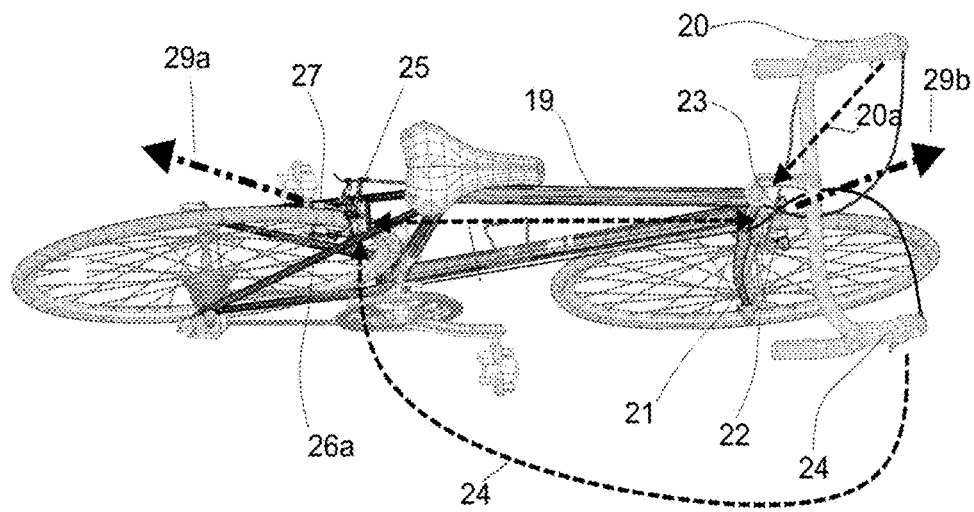
Figure 10:
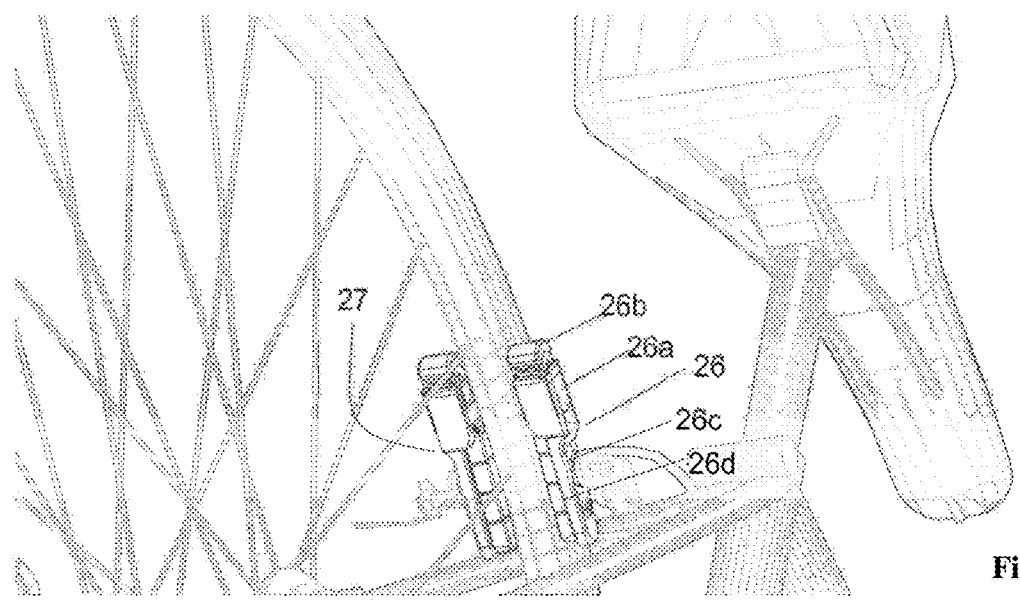
Figure 11:
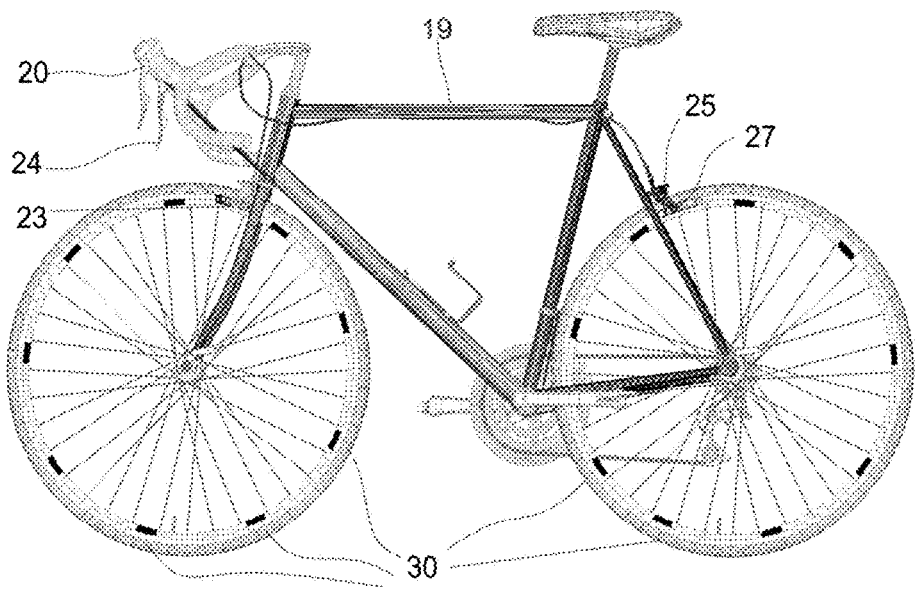

Two side views of the brake shoe (10), according to the inside view of the shifting unit shown in FIG. 6 When braking on the rim, lateral pressure (19) acts on the brake pad (11) and also on the ideally harder or very wear-resistant spacer element (16). As the thickness of the brake rubber decreases, the spacer element (16) is pushed further away from the rim in the groove (18) and exerts corresponding lateral pressure (21) on the generator slide (12b), so that the latter and the generator part (12) firmly connected move further outwards (22) in the groove (17). In this way, the generator housing (12) is protected from abrasion on the rim even when the brake rubber thickness decreases.

FIG. 8

A brake shoe (10) with a brake rubber (11), said brake shoe being connected to the generator housing (12) via a parallelogram spring (15) (e.g. simply constructed from flexible plastic elements/lamellas or as a fixed parallelogram with an inner spring element). An abrasion-resistant additional element (15a) prevents the generator housing (12) from coming into contact with the rim. In this way the generator can always be brought close to the rim and thus achieve a relatively high current output. When braking, the brake shoe (10)/brake rubber (11) moves in the direction of the rim (15b). When the wear-resistant additional element (15a) comes into contact with the rim, a force (15c) acts on the parallelogram spring (15) and results in a displacement (15d) of the generator housing relative to the brake shoe (10).

FIG. 9

A bicycle (19) from a lateral bird's-eye view, which is in accordance with the invention equipped with 4 contactless brake shoe generators (22, 23, 26, 27), which, in addition to a navigation aid for indicating an upcoming turning operation, can also be used without additional signal transmitters or external control devices to be attached, using the left brake lever (20) and the right brake lever (24) as a flashing system for indicating left/right turning. If the left brake lever (20) is actuated briefly (even without the brake being fully depressed for braking), a temporary significant increase in speed is detected on the right (22) and left side (23) even before the two brake blocks of the front brake shoe generator (21) come into contact with the rim in the electronics of the front contactless brake shoe generators. The corresponding signal (20a) (repeated twice if necessary) is interpreted as a turning signal to the left, so that the left-hand front lamp (23) changes over to the flashing mode (29a) and also sends a radio signal (28) for turning left (e.g. via Bluetooth or ANT+) to the rear lamps (26, 27), of which the left-hand one (27) now also switches to the left-turning/flashing mode (29b).

Accordingly, the signal to turn right is given via the right brake lever (24): One or two brief actuations of the right brake lever (24) cause a noticeable increase in magnet wheel rotation speed (by reduced rim distance) of the contactless brake shoe generators on the right (22) and left (23) sides. The corresponding signal (24a) (repeated twice if necessary) is interpreted as a turning signal to the right, so that the right-hand tail light (26) switches to flashing mode and also sends a radio signal (28) for turning right to the front lights (22, 23), of which the right-hand one (22) also switches to the turning mode (flashing mode).

FIG. 10

A bottom-up view of a pair of inventional non-contact tail light eddy current generators integrated into the right (26) and left (27) brake shoe mounted on a bicycle. Compatibility with standard rim brakes allows for mounting without additional adapters on the bicycle. On the right side you can see: The unit consists of the generator (26a), headlight (26b), brake shoe housing (26c) and brake rubber (26d).

FIG. 11

A bicycle (19) with inventive equipment with phosphorescent strips (30) on the sides of the rim below the braking surface in left side view. The strips can be applied as segments or over the entire circumference of the rim or tyre, or they can be already incorporated. When passing the headlamp (23,27), each segment (30) is irradiated once per wheel revolution and thus "charged", so that in the further course of the wheel revolution this light is emitted again by the phosphorescence property. The front wheel and rear wheel thus light up from the side to the full extent while driving.

The invention claimed is:

1. Device of one or multiple contactless eddy current generators each containing at least one magnetic wheel opposed to moveable conductive counter elements (2) in combination with units to detect characteristic magnetic wheel speed profiles, said speed profiles are processed and used to exchange wirelessly internal data signals between generator units and used to exchange wirelessly external data signals with external devices, characterized in that the counter element is a bicycle wheel and the eddy current generators power separate bicycle lighting units, said lighting units (14) are equipped with a receiving unit for receiving navigation signals, said navigation signals for turning left or right or reversing transmitted from a navigation system or smart phone are received in the lighting units and displayed as a flashing signal in the lighting units on the left or right side or both sides simultaneously (as a signal for reversing) as a navigation aid for the cyclist and simultaneously as a turning signal for other road users.

2. Device according to claim 1 containing one or more contactless eddy current generators opposed to the conductive counter element, characterized in that one generator of the system uses a larger dipole wheel (1) with a large field strength (8) and another generator with a smaller dipole wheel (1b) with a small field strength which is too small to include the larger magnet wheel, said smaller dipole wheel (1b) is arranged within the magnetic field of the dipole wheel (1).

3. Device according to claim 1, characterized in that it is a spring parallelogram (15) mechanism and the generator is positioned closer to the rim than the generator by means of an abrasion-resistant, tightly linked spacer element (15a), is protected from contact with the rim by being able to spring away from the rim (2) via the parallelogram spring (15) when the spacer element comes into contact with the rim (during braking or due to rim imbalance) and returning to its initial position accordingly after the rim contact has ended.

4. Device according to claim 1, characterised in that by means of characteristic magnetic wheel speed profiles which recur with each rotation of the counter element, the duration of rotation and thus the instantaneous speed is determined by means of a microcontroller and can be sent wirelessly to external receiving or display devices by means of an integrated radio unit.

5. Device according to claim 1, characterized in that the counter element is a bicycle wheel and by means of a characteristic magnetic wheel speed recurring with each pedal revolution profile, the pedal revolution duration and thus the cadence is determined by a microcontroller and can be sent wirelessly to external receivers or display devices using an integrated radio unit.

6. Device according to claim 1, characterized in that the counter element is a bicycle wheel and the probable occurrence of an accident event is detected by means of characteristic magnetic wheel speed profiles and an emergency call signal is transmitted by means of an integrated radio unit.

7. Device according to claim 6, characterized in that the counter element is a bicycle wheel and an emergency call signal is transmitted after a plurality of magnet wheel speed profiles determined in the system are exchanged with one another via radio units and analyzed with respect to the probability of an accident.

8. Device according to claim 1, characterized in that the counter element is a bicycle wheel and radio signals are sent and received in accordance with standardized radio standards for vehicle 2 vehicle communication and for vehicle 2 X communication by an integrated radio unit operated by the contactless generator, in order to exchange and display important collision avoidance data with other road users or devices.

9. Device of one or multiple contactless eddy current generators each containing at least one magnetic wheel opposed to moveable conductive counter elements (2) in combination with units to detect characteristic magnetic wheel speed profiles, said speed profiles are processed and used to exchange wirelessly internal data signals between generator units and used to exchange wirelessly external data signals with external devices, characterised in that it is a displacement mechanism, the fixing element (10) having a groove (17) (respectively (or elongated recess) open to the generator unit (12) and to the counter element (2), and the generator unit is connected to the fixing element in a laterally displaceable manner via a slide counterpart (12*b*) movable in said groove under lateral pressure, in such a way that an additional slide spacer element (16) moves the generator unit (12) away from the counter element when getting in contact with the counter element, by shifting it relative to fixing element and hence prevents contact of said generator unit with the counter element, without a return to the initial generator position after termination of the contact between counter element and spacer element.

10. Device according to claim 9, characterized in that the counter element is a bicycle wheel and the eddy current generators power separate bicycle lighting units, said generators are connected to the fixing element, in said lighting units a turning signal is generated by the cyclist by means of a one-time or repeated slight application of the left (20) or right rim brake (24), said signal can be specified, said signal is detected within the controller electronics of the contactless eddy current generators by means of a short-term reduced rim distance resulting in increased rotation speed of the magnet wheel, in such a way that the a flashing signal is applied to the corresponding left or right lighting unit and a corresponding signal (28) is sent for turning left or right to the second lighting unit on the turning side, which also switches to the flashing mode for displaying the turning process, after receiving said signal (28).

11. Device of one or multiple contactless eddy current generators each containing at least one magnetic wheel opposed to moveable conductive counter elements (2) in combination with units to detect characteristic magnetic wheel speed profiles, said speed profiles are processed and used to exchange wirelessly internal data signals between generator units and used to exchange wirelessly external data signals with external devices characterised in that the eddy current generator powers a bicycle lighting unit, said lighting unit or its housing (14) comprises phosphorescent material which enables a parking light function by phosphorescence, after the lighting unit has been illuminated with suitable light (with blue to ultraviolet spectrum) over a period of time.

12. Device according to claim 11, characterised in that the eddy current generator powers a bicycle lighting unit, and phosphorescent material (30) is applied to the counter element (2), said phosphorescent material is irradiated with suitable light (with blue to ultraviolet spectrum) by said lighting unit (13) and thus provides a permanent lateral illumination, said lighting unit being powered by a contactless eddy current generator.

13. Device according to claim 11, characterized in that the lighting electronics is constructed as an anti-parallel circuit consisting of an LED with suitable light for phosphorus charging for a parking light and/or wheel side lighting and a driving light LED with preferably white front light or red rear light.

* * * * *